(12) United States Patent
Yang et al.

(10) Patent No.: US 12,619,309 B2
(45) Date of Patent: May 5, 2026

(54) TACTILE SENSATION GENERATION METHOD, HAPTIC REPRODUCTION DEVICE AND COMPUTER STORAGE MEDIUM

(71) Applicants: Beijing BOE Technology Development Co., Ltd., Beijing (CN); BOE Technology Group Co., Ltd., Beijing (CN)

(72) Inventors: Zhiming Yang, Beijing (CN); Jijing Huang, Beijing (CN); Xiaotong Liu, Beijing (CN)

(73) Assignees: Beijing BOE Technology Development Co., Ltd., Beijing (CN); BOE Technology Group Co., Ltd., Beijing (CN)

( * ) Notice: Subject to any disclaimer, the term of this patent is extended or adjusted under 35 U.S.C. 154(b) by 273 days.

(21) Appl. No.: 17/795,244

(22) PCT Filed: Sep. 15, 2021

(86) PCT No.: PCT/CN2021/118571
§ 371 (c)(1),
(2) Date: Jul. 26, 2022

(87) PCT Pub. No.: WO2023/039759
PCT Pub. Date: Mar. 23, 2023

(65) Prior Publication Data
US 2024/0184366 A1 Jun. 6, 2024

(51) Int. Cl.
*G06F 3/01* (2006.01)
*G06F 3/041* (2006.01)

(52) U.S. Cl.
CPC .............. *G06F 3/016* (2013.01); *G06F 3/041* (2013.01)

(58) Field of Classification Search
USPC .......................................................... 715/702
See application file for complete search history.

(56) References Cited

U.S. PATENT DOCUMENTS 9,417,695 B2 * 8/2016 Griffin .................. G06F 3/0416
10,401,961 B2 * 9/2019 Cruz-Hernandez ..... G06F 3/016
(Continued)

FOREIGN PATENT DOCUMENTS

CN 105159459 A 12/2015
CN 105446646 A 3/2016
(Continued)

OTHER PUBLICATIONS

Office Action dated Aug. 23, 2025 for CN 202180002553.9 and English Translation.

*Primary Examiner* — Christopher J Fibbi
(74) *Attorney, Agent, or Firm* — Ling Wu; Stephen Yang; Ling and Yang Intellectual Property

(57) ABSTRACT

A haptic reproduction device includes a display module, a haptic reproduction module and a control module. The tactile sensation generation method includes: acquiring a position of a virtual functional area touched by a user and detected by the display module; outputting a first drive signal to the haptic reproduction module through the control module when the position of the virtual functional area touched by the user is an edge position of the virtual functional area, so that the haptic reproduction module generates a boundary tactile sensation; outputting a second drive signal to the haptic reproduction module through the control module when the position of the virtual functional area touched by the user is a middle position of the virtual functional area, so that the haptic reproduction module generates a haptic feedback.

18 Claims, 5 Drawing Sheets

(56)　　　　　　References Cited

U.S. PATENT DOCUMENTS

| | | | |
|---|---|---|---|
| 10,490,035 B2 * | 11/2019 | Morrell | H04L 12/1895 |
| 2009/0174672 A1 | 7/2009 | Schmidt | |
| 2010/0141606 A1 * | 6/2010 | Bae | G06F 3/016 |
| | | | 345/173 |
| 2010/0156818 A1 * | 6/2010 | Burrough | G06F 3/04883 |
| | | | 345/173 |
| 2014/0253303 A1 * | 9/2014 | Levesque | G06F 3/016 |
| | | | 340/407.1 |
| 2014/0267076 A1 * | 9/2014 | Birnbaum | G06F 3/016 |
| | | | 340/407.1 |
| 2015/0169059 A1 * | 6/2015 | Behles | G06F 3/0488 |
| | | | 345/173 |
| 2016/0258758 A1 * | 9/2016 | Houston | G01D 5/145 |
| 2016/0259528 A1 * | 9/2016 | Foss | G06T 13/80 |
| 2016/0320901 A1 * | 11/2016 | Son | G06F 3/016 |
| 2017/0168574 A1 * | 6/2017 | Zhang | G06F 3/016 |
| 2018/0081443 A1 * | 3/2018 | Morofuji | G06F 3/04883 |
| 2018/0130400 A1 * | 5/2018 | Meitl | G09G 3/007 |
| 2020/0403545 A1 * | 12/2020 | Zheng | H02P 25/032 |

FOREIGN PATENT DOCUMENTS

| | | | |
|---|---|---|---|
| CN | 105867765 A | 8/2016 | |
| CN | 206460411 U | 9/2017 | |
| CN | 108885512 A | 11/2018 | |
| CN | 110380664 A | 10/2019 | |
| CN | 110622111 A | 12/2019 | |
| CN | 111142659 A | 5/2020 | |
| CN | 111193457 A | 5/2020 | |
| CN | 112799503 A | 5/2021 | |
| CN | 112860074 A | 5/2021 | |
| CN | 112865591 A | 5/2021 | |
| CN | 112925417 A | 6/2021 | |

* cited by examiner 1031
1032
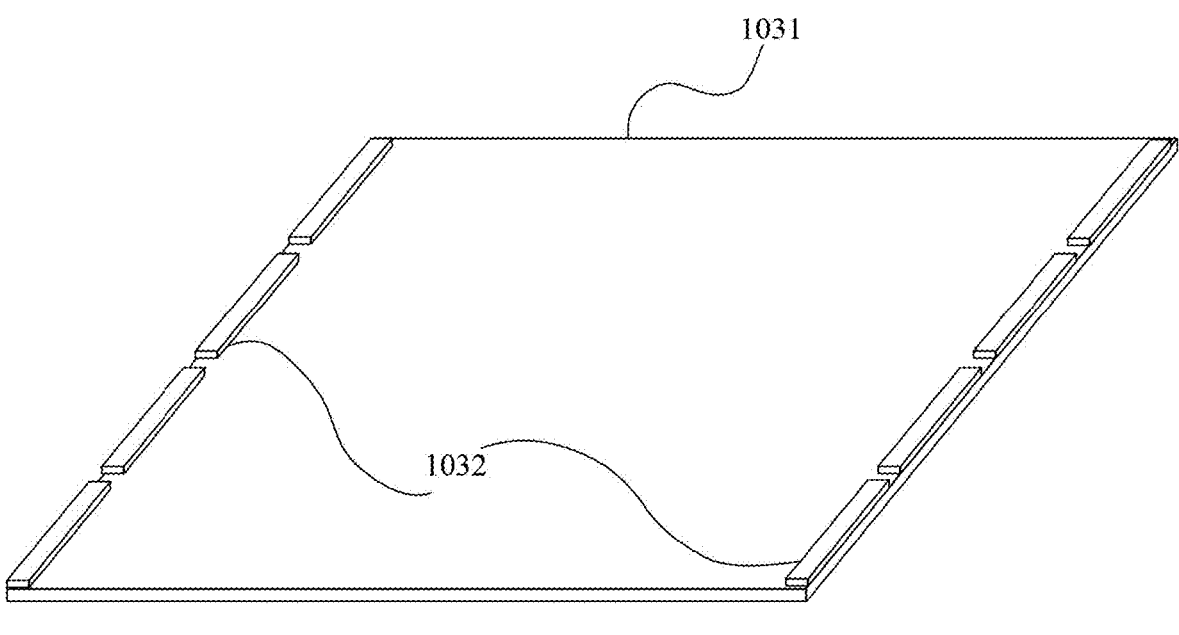
FIG. 3A
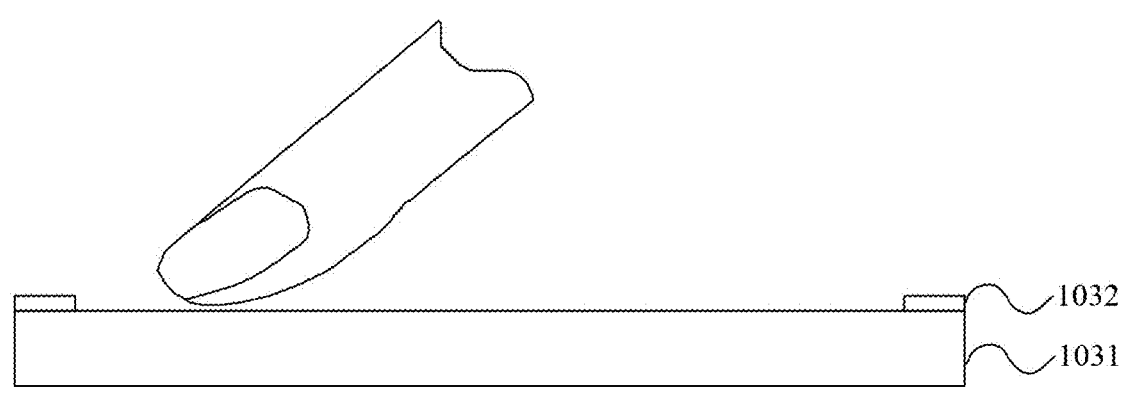
1032
1031
FIG. 3B
z
y      x
FIG. 3C

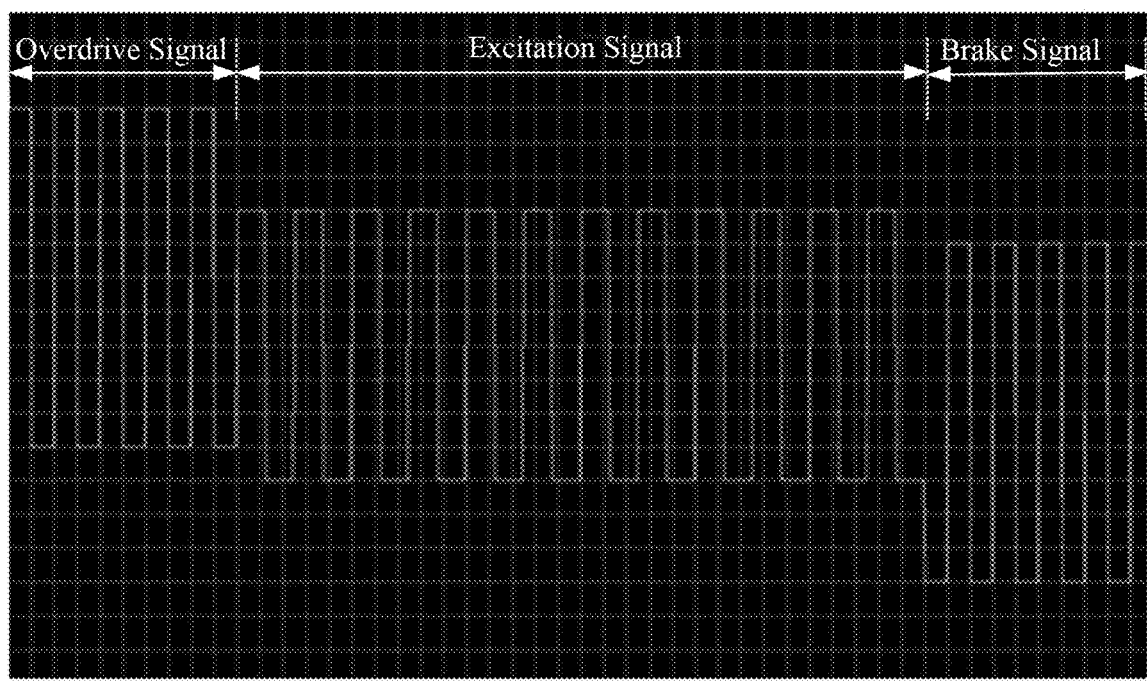
FIG. 5B
Display Module 601 → Control Module 602 → Haptic Reproduction Module 603
FIG. 6
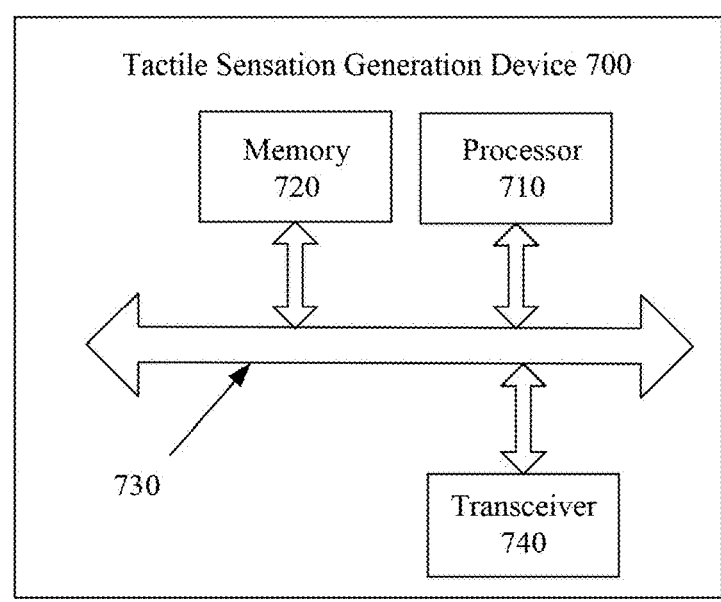
FIG. 7

TACTILE SENSATION GENERATION METHOD, HAPTIC REPRODUCTION DEVICE AND COMPUTER STORAGE MEDIUM

CROSS-REFERENCE TO RELATED APPLICATION

This application is a national stage application of PCT Application No. PCT/CN2021/118571, which is filed on Sep. 15, 2021 and entitled "Tactile Sensation Generation Method, Haptic Reproduction Device and Computer Storage Medium", the content of which is incorporated herein by reference in its entirety.

TECHNICAL FIELD

Embodiments of the present disclosure relate to, but are not limited to, the field of touch control technology, and in particular, to a tactile sensation generation method, a haptic reproduction device and a computer storage medium.

BACKGROUND

At present, most of the virtual haptic keys provide feedback to users by controlling the presence or absence of an excitation signal. When a human's finger touches a key area of an interactive interface, an actuator works to drive a substrate to generate vibration; when the finger leaves the key area, the drive stops and the haptic feedback disappears. The tactile sensation of the key comes from whether there is the excitation signal to drive the actuator. However, the formation of human haptic sense is extremely complex, and it is impossible to truly restore the boundary feel only through a single haptic feedback with or without the vibration when touching an edge of a physical key in reality.

SUMMARY

The following is a summary for subject matters described herein in detail. The summary is not intended to limit the scope of protection of claims.

An embodiment of the present disclosure provides a tactile sensation generation method for a haptic reproduction device, the haptic reproduction device including a display module, a haptic reproduction module and a control module, and the tactile sensation generation method including:

acquiring a position of a virtual functional area touched by a user and detected by the display module;

outputting a first drive signal to the haptic reproduction module through the control module when the position of the virtual functional area touched by the user is an edge position of the virtual functional area, so that the haptic reproduction module generates a boundary tactile sensation;

outputting a second drive signal to the haptic reproduction module through the control module when the position of the virtual functional area touched by the user is a middle position of the virtual functional area, so that the haptic reproduction module generates a haptic feedback.

In some exemplary embodiments, the first drive signal includes a first signal, a second signal, and a third signal; a driving cycle corresponding to the first drive signal is divided into a first time period, a second time period and a third time period; the haptic reproduction module is configured to acquire the first signal within the first time period so as to achieve a stable vibration state; the haptic reproduction module is configured to acquire and vibrate the second signal according to the type and intensity of the boundary tactile sensation within the second time period; the haptic reproduction module is configured to acquire the third signal and stop vibration within the third time period; the type and intensity of the boundary tactile sensation are determined according to the frequency and voltage amplitude of the first signal and the frequency and voltage amplitude of the second signal.

In some exemplary embodiments, a length of the first time period is less than a length of the second time period, and a length of the third time period is less than the length of the second time period.

In some exemplary embodiments, the frequency of the second signal is less than the frequency of the first signal.

In some exemplary embodiments, the intensity of the boundary tactile sensation generated by the haptic reproduction module is proportional to the voltage amplitude of the second signal.

In some exemplary embodiments, the voltage amplitude of the first signal is greater than or equal to that of the second signal.

In some exemplary embodiments, the maximum voltage amplitude of the second signal is between 70% and 100% of the maximum voltage amplitude of the first signal.

In some exemplary embodiments, the haptic reproduction module includes an actuator and a touch control substrate, the actuator is disposed on the touch control substrate, and the haptic reproduction module includes multiple resonant frequencies, and different resonant frequencies correspond to different vibration types.

In some exemplary embodiments, a voltage amplitude of the first signal is less than or equal to a maximum drive voltage amplitude of the actuator.

In some exemplary embodiments, the frequency of the first signal is a first frequency, the first frequency is a resonant frequency of the haptic reproduction module, or a difference between the first frequency and the resonant frequency of the haptic reproduction module is within a preset first difference range.

In some exemplary embodiments, the length of the first time period is N1 first cycles, the first cycle=1/the first frequency, N1>0, and the magnitude of N1 is determined according to the motion acceleration measured on the haptic reproduction module.

In some exemplary embodiments, the frequency of the second signal is a second frequency, or the second signal is an amplitude modulated wave with the second frequency as a carrier frequency; the second frequency is the resonant frequency of the haptic reproduction module, or the difference between the second frequency and the resonant frequency of the haptic reproduction module is within a preset second difference range.

In some exemplary embodiments, the length of the second time period is N2 second cycles, the second cycle=1/the second frequency, N2>0, and the magnitude of N2 is determined according to the frequency of the second signal and the type of boundary tactile sensation generated by the haptic reproduction module.

In some exemplary embodiments, the frequency of the third signal is a third frequency, the length of the third time period is N3 third cycles, the third cycle=1/the third frequency; the third frequency is the same as the second frequency, and N3 is between 1 and 3.

In some exemplary embodiments, the phase of the second signal is 1800 out of phase of the third signal.

In some exemplary embodiments, the waveform type of the first signal includes a square wave, a sine wave and a triangular wave.

In some exemplary embodiments, the waveform type of the second signal includes a square wave, a sine wave, a triangular wave and an amplitude modulated way.

In some exemplary embodiments, the waveform type of the third signal includes a square wave, a sine wave and a triangular wave.

An embodiment of the present disclosure also provides a haptic reproduction device including a display module, a haptic reproduction module and a control module, wherein the display module is configured to detect a position of the virtual functional area touched by a user; the control module is configured to acquire a position of the virtual functional area touched by the user detected by the display module, outputting a first drive signal to the haptic reproduction module through the control module when the position of the virtual functional area touched by the user is an edge position of the virtual functional area; outputting a second drive signal to the haptic reproduction module through the control module when the position of the virtual functional area touched by the user is a middle position of the virtual functional area; the haptic reproduction module is configured to receive the first drive signal outputted by the control module and generate the boundary tactile sensation; or, the second drive signal outputted by the control module is received to generate a haptic feedback.

In some exemplary embodiments, the haptic reproduction module includes an actuator and a touch control substrate, the actuator is disposed on the touch control substrate, the haptic reproduction module includes multiple resonant frequencies, and different resonant frequencies correspond to different vibration types.

In some exemplary embodiments, the actuator includes a piezoelectric actuator, a linear motor actuator, an eccentric rotor actuator, and an electrostatic actuator.

An embodiment of the present disclosure also provides a computer storage medium, storing computer executable instructions, wherein the computer executable instructions are used for performing steps of the tactile sensation generation method according to any one of the previous claims.

After the accompanying drawings and detailed descriptions are read and understood, other aspects may be understood.

BRIEF DESCRIPTION OF DRAWINGS

Accompanying drawings are used for providing further understanding of technical solutions of the present disclosure, constitute a part of the specification, and together with the embodiments of the present disclosure, are used for explaining the technical solutions of the present disclosure but not to constitute limitations on the technical solutions of the present disclosure. Shapes and sizes of various components in the drawings do not reflect actual scales, and are only intended to schematically illustrate contents of the present disclosure.

FIG. 3A is a schematic diagram of a structure of a haptic reproduction module provided by an exemplary embodiment of the present disclosure.

FIG. 3B is a schematic diagram of an operation scene of the haptic reproduction module shown in FIG. 3A.

FIGS. 3C and 3D are schematic diagrams of two vibration situations of a touch control substrate provided by an exemplary embodiment of the present disclosure.

FIG. 5B is a schematic diagram of yet another drive signal provided by an exemplary embodiment of the present disclosure.

FIG. 6 is a schematic diagram of a structure of a haptic reproduction device provided by an exemplary embodiment of the present disclosure.

FIG. 7 is a schematic diagram of a structure of a tactile sensation generation device provided by an exemplary embodiment of the present disclosure.

DETAILED DESCRIPTION

To make objectives, technical solutions, and advantages of the present disclosure clearer, the embodiments of the present disclosure will be described in detail with reference to the accompanying drawings. It is to be noted that the embodiments in the present disclosure and features in the embodiments may be randomly combined with each other if there is no conflict.

Unless otherwise defined, technical terms or scientific terms used in the embodiments of the present disclosure should have usual meanings understood by those of ordinary skill in the art to which the present disclosure pertains. "First", "second", and similar terms used in the embodiments of the present disclosure do not represent any order, quantity, or importance, but are only used for distinguishing different components. "Include", "contain", or a similar term means that an element or object appearing before the term covers an element or object and equivalent thereof listed after the term and does not exclude other elements or objects.

At present, when a finger touches a virtual key on a surface of an interactive interface of a haptic reproduction product, most of the virtual keys give feedback to users by controlling the presence or absence of an excitation signal. When a human finger touch the key area of the interactive interface, the actuator works to drive the substrate to generate vibration; when the finger leaves the key area, the drive stops and the haptic feedback disappears. The tactile sensation of the key comes from whether there is the excitation signal to drive the actuator. However, the formation of human haptic sense is extremely complex, and it is impossible to deeply restore truly physical keys only through a single haptic feedback with or without the vibration. The physical keys have edges, and there are different haptic sense at the edge of the key and a central area of the key when the finger touches. In order to realize the deep restoration of the key, it is necessary to generate different haptic excitation when the finger touches, so that the finger can feel both an edge part and a main part of the key.

Figure 1:
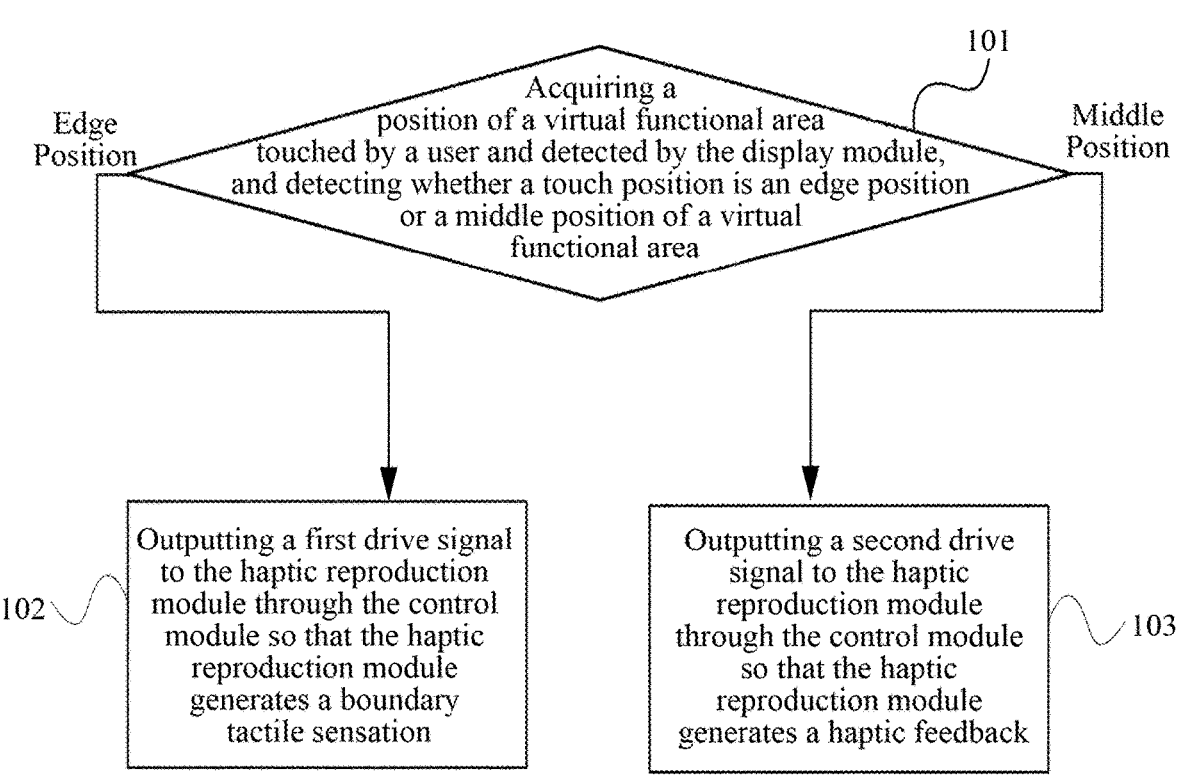
FIG. 1 is a schematic diagram of a flowchart of a tactile sensation generation method provided by an exemplary embodiment of the present disclosure.

As shown in FIG. 1, an embodiment of the present disclosure provides a tactile sensation generation method for a haptic reproduction device including a display module, a haptic reproduction module and a control module. The tactile sensation generation method includes the following steps:

Act 101: acquiring a position of a virtual functional area touched by a user and detected by the display module;

Act 102: outputting a first drive signal to the haptic reproduction module through the control module when the position of the virtual functional area touched by the user is an edge position of the virtual functional area, so that the haptic reproduction module generates a boundary tactile sensation;

Act 103: outputting a second drive signal to the haptic reproduction module through the control module when the position of the virtual functional area touched by the user is a middle position of the virtual functional area, so that the haptic reproduction module generates a haptic feedback.

The tactile sensation generation method of the embodiment of the present disclosure outputs the first drive signal to the haptic reproduction module through the control module when the position of the virtual functional area touched by the user is the edge position of the virtual functional area, and outputs the second drive signal to the haptic reproduction module through the control module when the position of the virtual functional area touched by the user is the middle position of the virtual functional area, and combines the tactile sensation of the boundary with the tactile sensation of the main body of the virtual functional area, and more truly restores the haptic feedback of the actual functional area.

In some exemplary embodiments, the first drive signal includes a first signal, a second signal, and a third signal, and a driving cycle corresponding to the first drive signal is divided into a first time period, a second time period, and a third time period.

The haptic reproduction module is configured to acquire the first signal within the first time period, thereby achieving a stable vibration state; the haptic reproduction module is configured to acquire the second signal and vibrate according to the type and intensity of the boundary tactile sensation within the second time period; the haptic reproduction module is configured to acquire the third signal and stop vibration within the third time period. The type and intensity of the boundary tactile sensation are determined according to the frequency and voltage amplitude of the first signal and the frequency and voltage amplitude of the second signal.

The tactile sensation generation method of the embodiment of the present disclosure divides the first drive signal into the first signal, the second signal and the third signal, and due to differences between the frequency and voltage amplitude of the first signal and the frequency and voltage amplitude of the second signal and by the signal switching between the first signal and the second signal, makes the haptic reproduction module generate the boundary tactile sensation, which can be combined with the tactile sensation of the main body of the virtual functional area to more truly restore the haptic feedback of the actual functional area.

Figure 2:
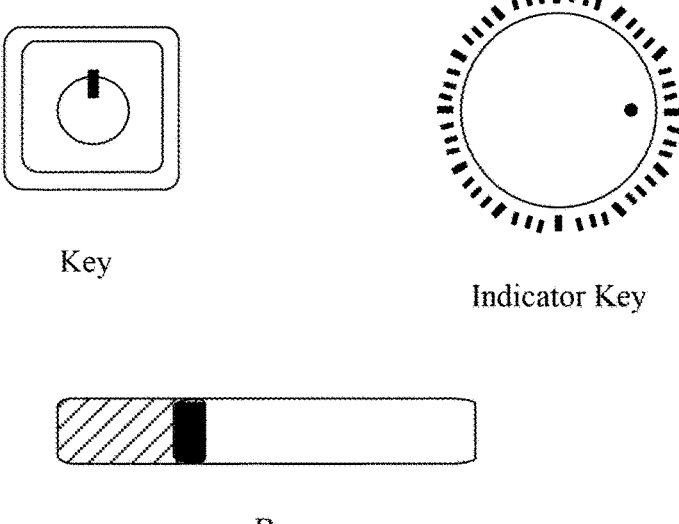
FIG. 2 is a schematic diagram of three virtual functional areas provided by an exemplary embodiment of the present disclosure.

In some exemplary embodiments as shown in FIG. 2, the types of the virtual functional area may include keys, bars, indicator keys and the like.

In some exemplary embodiments, as shown in FIG. 3A, the haptic reproduction module includes an actuator 1032 and a touch control substrate 1031. The actuator 1032 is disposed on the touch control substrate 1031 (the actuator 1032 and the touch control display substrate 1031 constitute a vibration substrate). The haptic reproduction module includes multiple resonant frequencies, and different resonant frequencies correspond to different vibration types.

As shown in FIG. 3B, when a finger touches the touch control substrate 1031 of the haptic reproduction product, an acceleration a varying with time t is generated because the actuator 1032 drives the touch control substrate 1031 to vibrate. Assuming that the mass of the touch control substrate 1031 is m, a normal acting force of the touch control substrate 1031 on the finger may be obtained as F=ma according to Newton's second law. When the finger touches the edge of the virtual key, it needs to feedback the edge vibration. Combined with the above mechanical analysis, if the vibration of the touch control substrate 1031 is controlled when the finger touches the edge of the virtual functional area, namely by controlling the acceleration a of the touch control substrate 1031, when the user touches the edge of the key, the vibration of different accelerations a of the touch control substrate 1031 can affect the normal force F on the finger, generate the corresponding boundary tactile sensation, and enrich the user's experience of the virtual functional area.

In some exemplary embodiments, a length of the first time period is less than a length of the second time period, the purpose of which is to cause the actuator to quickly reach the vibration amplitude required for operation during the first time period. A length of the third time period is less than a length of the second time period, the purpose of which is to cause the actuator to quickly stop the vibration of the actuator during the third time period.

In order to realize the boundary tactile sensation of the virtual functional area, the tactile sensation generation method of the embodiment of the present disclosure generates the following three drive signals: (1) the first signal: configured for quickly driving the actuator 1032 to the vibration amplitude required for operation in the first time period; (2) the second signal: configured for making the touch control substrate 1031 generate different normal forces in the second time period by designing different driving waveforms; (3) the third signal: configured for quickly stopping the vibration of the actuator 1032 in the third time period to prevent the ringing phenomenon of the actuator 1032 so as to generate a strong sense of boundary.

In some exemplary embodiments, the type and intensity of the boundary tactile sensation generated by the haptic reproduction module are determined according to the frequency and voltage amplitude of the first signal and the frequency and voltage amplitude of the second signal.

In some exemplary embodiments, the frequency of the second signal is less than the frequency of the first signal.

Exemplarily, the first signal may be a high frequency signal (e.g., the frequency of the first signal may be 23.7 KHz) and the second signal may be a low frequency signal (e.g., the frequency of the second signal may be 200 Hz).

In some exemplary embodiments, the intensity of the boundary tactile sensation generated by the haptic reproduction module is proportional to the voltage amplitude of the second signal.

In some exemplary embodiments, the greater the voltage amplitude of the second signal is, the stronger the intensity of the boundary tactile sensation generated by the haptic reproduction module is; the smaller the voltage amplitude of the second signal is, the weaker the intensity of the boundary tactile sensation generated by the haptic reproduction module is.

Taking an actuator as an example, an excitation frequency is within the range of 10 Hz to 1 kHz, because the display resolution perceived and touched by an individual is certain, and with the increase of frequency, the number of waveform periods that produce boundary tactile sensation also increases. The driving waveforms with different frequencies F, different periods N and different drive voltages V correspond to different amplitudes of the substrate and different normal forces applied to the fingers. Different frequencies and different periods mainly affect the types of boundary tactile sensation, such as sharp boundary sensation, steps, gentle slopes, etc. Different drive voltages mainly affect the intensity of boundary tactile sensation.

Figure 3D:
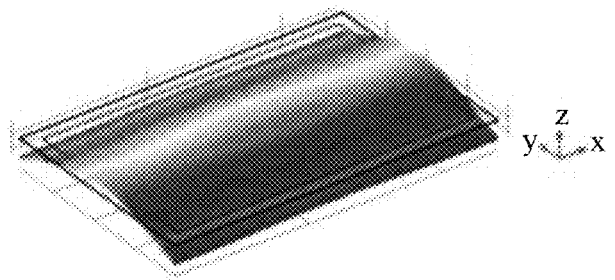

In some exemplary embodiments, the frequency of the second signal is mainly selected based on the resonant frequency of the haptic reproduction module composed of the actuator and the touch control substrate. Because the mode of haptic reproduction module is different at different resonant frequencies, different vibration types will be produced. For example, when the frequency of the second signal is about 200 Hz, the vibration of the touch control substrate is shown in FIG. 3C, and at this time, the touch control substrate resonates along the short side; When the frequency of the second signal is about 500 Hz, the vibration of the touch control substrate is shown in FIG. 3D. At this time, the touch control substrate resonates along the long side.

In some exemplary embodiments, the voltage amplitude V1 of the first signal is greater than or equal to the voltage amplitude V2 of the second signal.

In some exemplary embodiments, the maximum voltage amplitude of the second signal is between 70% and 100% of the maximum voltage amplitude of the first signal.

In some exemplary embodiments, the voltage amplitude V1 of the first signal is less than or equal to the maximum drive voltage amplitude of the actuator.

In the embodiment of the present disclosure, a driving process of the first signal is to make the actuator quickly enter the normal operation state, because it takes a certain time to start vibration of the actuator. Generally, a starting time of the vibration for low-frequency vibrators such as linear motors is about tens of milliseconds, and the starting time of the vibration for piezoelectric ceramic actuators is generally several milliseconds. The driving process of the first signal makes the actuator reach the amplitude of normal operation state quickly by applying a voltage greater than that of normal operation state, which thus may be called a overdriving process.

In an embodiment of the present disclosure, the voltage amplitude V2 is generally related to characteristics of the actuator, and in some exemplary embodiments, the voltage amplitude V2 may be 80% of the maximum peak voltage of the actuator.

In some exemplary embodiments, the frequency of the first signal is a first frequency F1, the first frequency F1 is a resonant frequency of the haptic reproduction module, or a difference between the first frequency F1 and the resonant frequency of the haptic reproduction module is within a preset first difference range.

In some exemplary embodiments, the preset first difference range may be ±50 Hz when the first frequency F1 is less than 1000 Hz; the preset first difference range may be ±200 Hz when the first frequency F1 is between 1000 Hz and 20 KHz; the preset first difference range may be ±500 Hz when the first frequency F1 is greater than 20 KHz.

In this embodiment, the preset first difference range may be determined according to the actual resonant frequency and the vibration characteristics of the haptic reproduction module. For example, when the resonant frequency of the haptic reproduction module is a first resonant frequency (exemplary, 200 Hz), the preset first difference range may be ±50 Hz; when the resonant frequency of the haptic reproduction module is a second resonant frequency (exemplary, 1200 Hz), the preset first difference range may be ±200 Hz, which is not limited by the present disclosure.

In some exemplary embodiments, the length of the first time period is N1 first cycles, the first cycle=1/first frequency, N1>0, and the magnitude of N1 is determined according to the measured motion acceleration of the haptic reproduction module.

In an embodiment of the present disclosure, the first frequency F1 is generally derived from some resonant frequency of the haptic reproduction module. The haptic reproduction module has greater than one resonant frequency, and different first frequencies may be selected according to the tactile sensation to be generated. For example, in order to generate a sharp boundary tactile sensation, it is hoped that a stimulation time to fingers will be relatively short, the first frequency F1 of several kilohertz may be selected, the voltage amplitude is V1, and N1 cycles of the resonant frequency may be applied, so that the actuator drives the touch control substrate to quickly reach the desired amplitude. N1 refers to the number of cycles of F1 frequency required. The selection of this value is related to the system characteristics composed of the actuator and touch control substrate, and may be determined according to the measured vibration acceleration of the haptic reproduction module. The voltage amplitude V1 of the first signal is related to the characteristics of the actuator and generally does not exceed the maximum drive voltage of the actuator, but is generally greater than the voltage amplitude V2 of the second signal.

In some exemplary embodiments, the frequency of the second signal is a second frequency F2 or the second signal is an amplitude modulated wave with the second frequency F2 as the carrier frequency; The second frequency F2 is the resonant frequency of the vibrating substrate, or a difference between the second frequency F2 and the resonant frequency of the vibrating substrate is within a preset second difference range.

In some exemplary embodiments, the preset second difference range may be ±50 Hz when the second frequency F2 is less than 1000 Hz; the preset second difference range may be +100 Hz when the second frequency F2 is between 1000 Hz and 20 KHz; the preset second difference range may be ±500 Hz when the second frequency F2 is greater than 20 KHz.

In this embodiment, the selection of the second frequency F2 is also based on the resonant frequency of the haptic reproduction module composed of the actuator and the touch control substrate, and different vibration types will be generated due to different modes of the haptic reproduction module under different resonant frequencies.

In this embodiment, the preset second difference range may be determined according to the actual resonant frequency and the vibration characteristics of the haptic reproduction module. For example, when the resonant frequency of the haptic reproduction module is the second resonant frequency (exemplary, 200 Hz), the preset second difference range may be ±50 Hz; when the resonant frequency of the haptic reproduction module is a second resonant frequency (exemplary, 1200 Hz), the preset second difference range may be ±100 Hz, which is not limited by the present disclosure.

In the embodiment of the present disclosure, the second signal may be a fixed frequency signal or an amplitude modulated wave signal with envelopes of other frequencies outside the fixed frequency.

In some exemplary embodiments, the length of the second time period is N2 second cycles, the second cycle=1/second frequency, N2>0, and the magnitude of N2 is determined according to the frequency of the second signal and the types of boundary tactile sensation generated by the haptic reproduction module.

In this embodiment, the selection of the number of the second cycles N2 is related to the current second frequency F2 and the desired type of the tactile sensation. The value of N2 will affect the sensory corpuscles of fingers, and the intuitive perception is that N2 will affect whether a single stimulus or multiple stimuli are received. For example, assuming F2=100 Hz, when the value of N2 is 1, the user senses a single stimulus, and when the value of N2 is 2, the stimulus sensed by the user is two stimuli that may be distinguished. However, with the increase of the second frequency F2, the value of N2 that may sense two stimuli will increase.

In some exemplary embodiments, the frequency of the third signal is a third frequency F3, the length of the third time period is N3 third cycles, the third cycle=1/third frequency, N3>0;

The third frequency F3 is the same as the second frequency F2, and N3 is a natural number between 1 and 3.

In the embodiment of the present disclosure, the value of N3 is related to the third frequency F3, and when the third frequency F3 is different, the required number of cycles of N3 is also different. In the actual application process, N3 is determined by the following method: making correction according to the motion acceleration and time curve measured by the haptic reproduction module.

In embodiments of the present disclosure, the third signal is mainly to quickly brake the actuator to a non-vibrating state. Because it takes a certain time, usually tens of milliseconds, for the actuator to stop vibrating naturally after stopping applying voltage, such tail sound has adverse effects on the tactile sensation, and applying a reverse voltage may help the actuator stop vibrating quickly.

The selection of the third frequency F3, the voltage amplitude V3 and the number of third cycles N3 used by the third signal is related to both the actuator characteristics and the desired tactile sensation. The third frequency F3 may be selected to be the same as the second frequency F2 used by the second signal, and N3 may be optimized and modified according to the measured acceleration-time curve.

In some exemplary embodiments, the voltage amplitude V3 of the third signal may be lower or higher than the voltage amplitude V2 of the second signal.

In some exemplary embodiments, the phase of the second signal is 180 degrees out of phase of the third signal.

In some exemplary embodiments, the waveform types of the first signal include a square wave, a sine wave, and a triangular wave.

In some exemplary embodiments, the waveform types of the second signal include a square wave, a sine wave, a triangular wave, and an amplitude modulated wave.

In some exemplary embodiments, the waveform types of the third signal include a square wave, a sine wave, and a triangular wave.

Figure 4A:
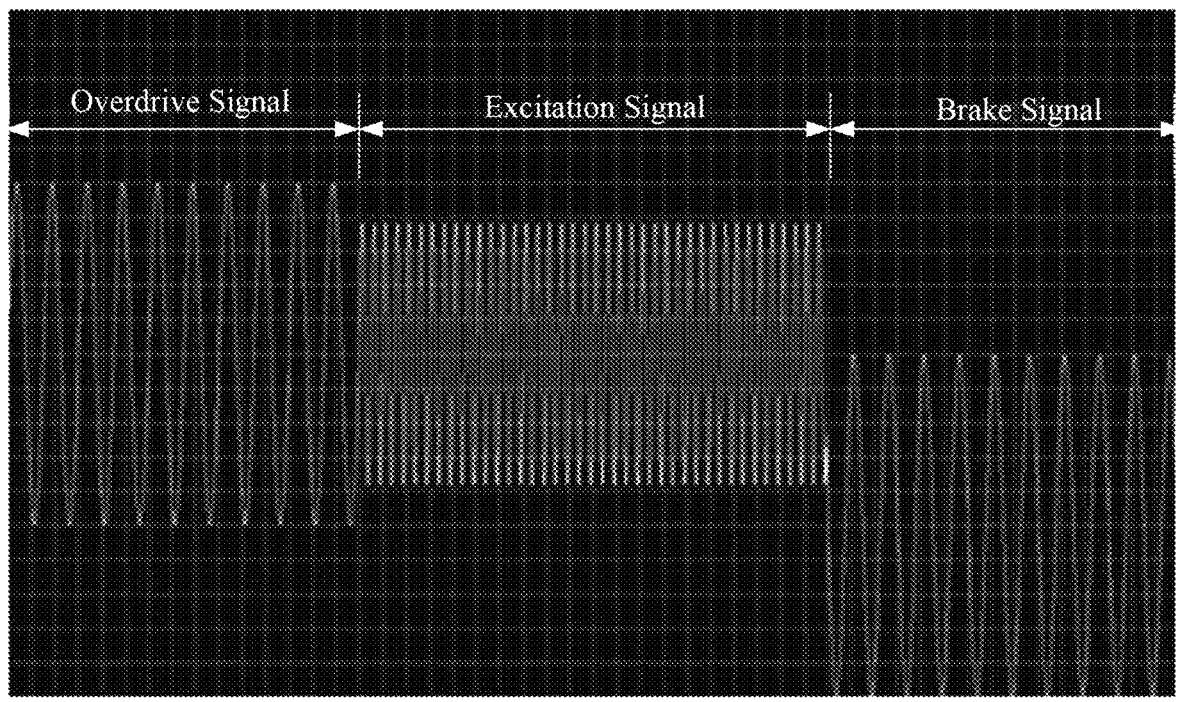
FIG. 4A is a schematic diagram of a drive signal provided by an exemplary embodiment of the present disclosure.
Figure 4B:
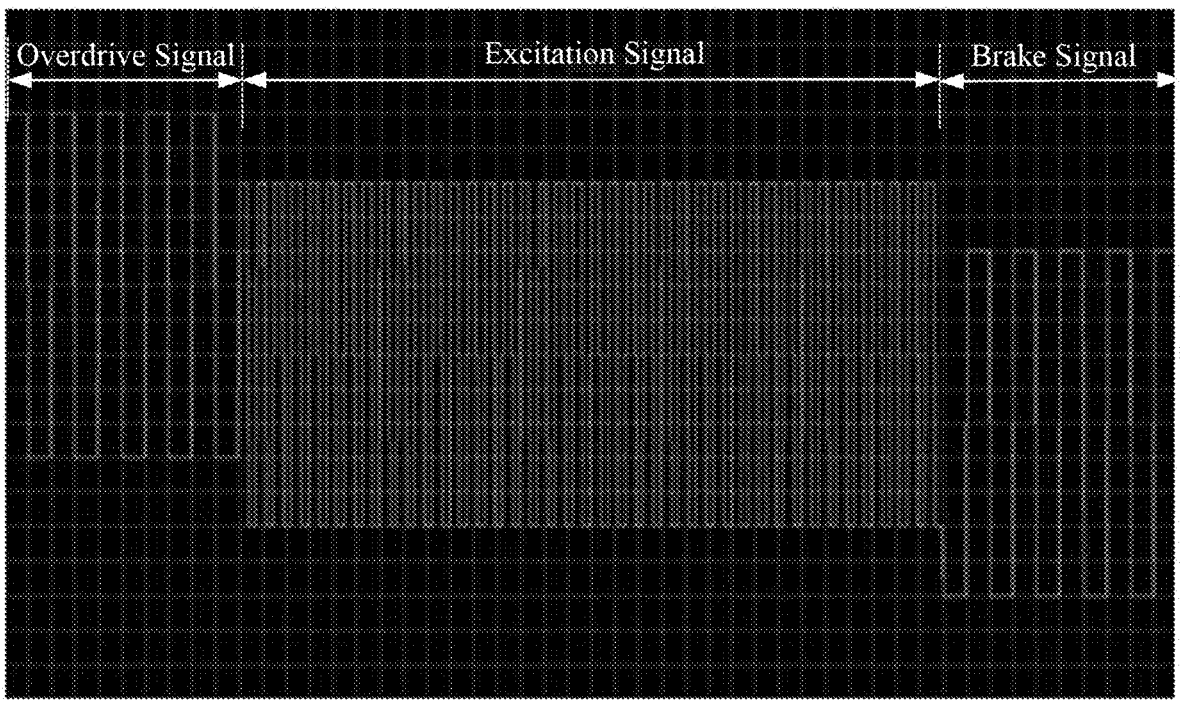
FIG. 4B is a schematic diagram of another drive signal provided by an exemplary embodiment of the present disclosure.

In this embodiment, the waveform types of the first signal may be the same as or different from those of the second signal; the waveform types of the second signal may be the same as or different from those of the third signal; the waveform types of the first signal may be the same as or different from those of the third signal. Exemplarily, as shown in FIG. 4A, the waveform types of the first signal, the second signal and third signal are all sine waves. As shown in FIG. 4B, the waveform types of the first signal, the second signal and the third signal are all square waves.

In the embodiment of the present disclosure, the boundary sense effect of the square wave is better than that of the sine wave, because the vibration generated by the square wave causes work made by the actuator driving the vibration substrate to be greater than the vibration generated by the sine wave causes the actuator to drive the vibration substrate to do work in the same time. However, the square wave is composed of many sinusoidal harmonics, which will produce some unpleasant noise when driving.

In the human perception system, humans' tactile sensation is not just a bandwidth. The mechanical vibration sensation of the skin may reach 10 kHz, but the ability to distinguish signals drops below 320 Hz. Under normal circumstances, the compressive stress can be perceived by human fingers in 10 Hz frequency band, the skin motion stimulation in 30 Hz frequency band, the vibration stimulation in 50~400 Hz frequency band, and the stretch of the skin can be perceived at low frequency. Therefore, different frequencies and different stimulation times will bring people different tactile sensations. It is found that human skin has the best perception effect on vibration stimulation at the frequency of 0.4~1000 Hz. When the resonant frequency of the actuator used in the virtual functional area is 700~800 Hz, the obtained tactile sensation is sharpest and the edge sensation is stronger, while at other frequencies within 0.4 Hz~1 KHz, the boundary tactile sensation increases when the frequency approaches its resonant frequency, and weakens and the edge becomes softer when it is far away from its resonant frequency.

Exemplarily, as shown in FIG. 4B, at the drive voltage of 40 Vpp and the frequency of 700 Hz, a square wave driving waveform of about 40 cycles will generate a sharp boundary tactile sensation.

Figure 5A:
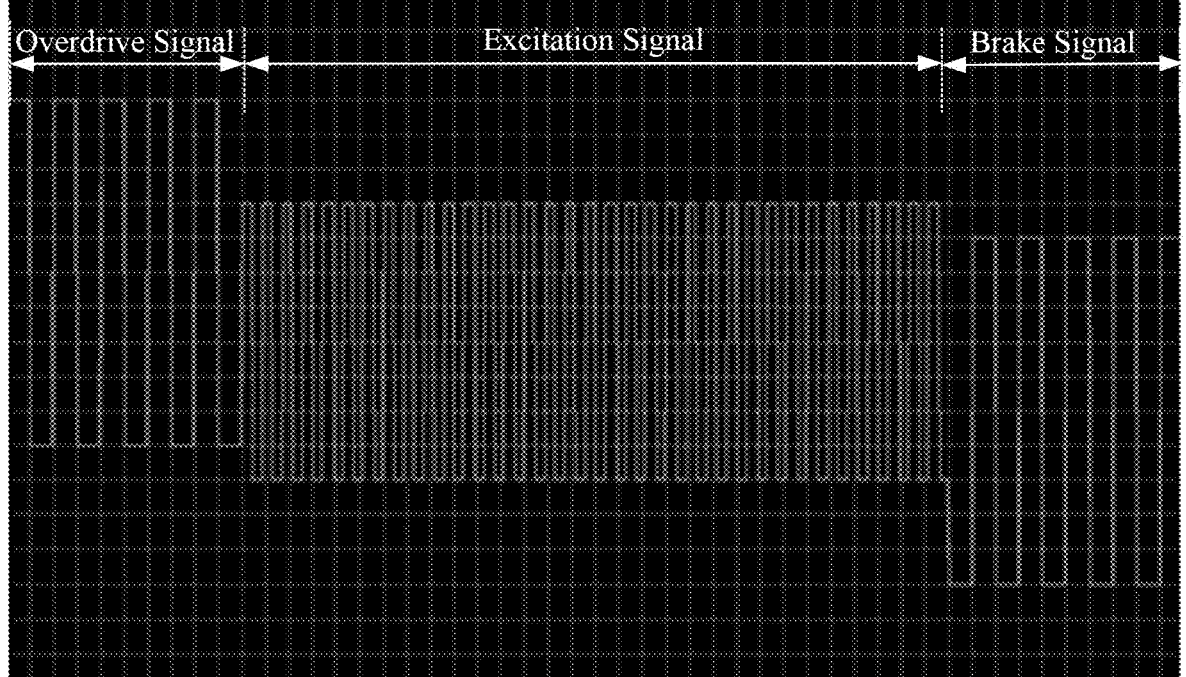
FIG. 5A is a schematic diagram of yet another drive signal provided by an exemplary embodiment of the present disclosure.

As shown in FIG. 5A, at the drive voltage of 40 Vpp and the frequency of 500 Hz, the square wave driving waveform of 35 cycles may generate a softer, gentle slope boundary tactile sensation.

As shown in FIG. 5B, at the drive voltage of 40 Vpp and the frequency of 100 Hz, the square wave driving waveform of 12 cycles may generate a stepped boundary tactile sensation.

Similarly, the voltage Vpp may be modulated to optimize the tactile sensation on the basis of the existing boundary tactile sensation.

As shown in FIG. 6, an embodiment of the present disclosure also provides a haptic reproduction device including a display module 601, a control module 602 and a haptic reproduction module 603.

The display module 601 is configured to detect a position of a virtual functional area touched by a user.

The control module 602 is configured to acquire a position of the virtual functional area touched by the user and detected by the display module 601, and when the position of the virtual functional area touched by the user is an edge position of the virtual functional area, a first drive signal is outputted to the haptic reproduction module 603; when the position of the virtual functional area touched by the user is a middle position of the virtual functional area, a second drive signal is outputted to the haptic reproduction module 603.

The haptic reproduction module 603 is configured to receive the first drive signal outputted from the control module 602 and generate a boundary tactile sensation; alternatively, to receive the second drive signal outputted by the control module 602 to generate a haptic feedback.

In some exemplary embodiments, the first drive signal includes a first signal, a second signal, and a third signal, and a driving cycle corresponding to the first drive signal is divided into a first time period, a second time period, and a third time period. The haptic reproduction module is configured to acquire the first signal within the first time period so as to achieve a stable vibration state. The haptic reproduction module is configured to acquire and vibrate a second signal according to the type and intensity of the boundary tactile sensation within the second time period. The haptic reproduction module is configured to acquire the third signal and stop vibration during the third time period, and the type and intensity of the boundary tactile sensation are determined according to the frequency and voltage amplitude of the first signal and the frequency and voltage amplitude of the second signal.

In the haptic reproduction device of the present disclosure, the first signal, the second signal, and the third signal are generated in the control module 602, and processes such as overdrive, excitation, and brake of the haptic reproduction module 603 are controlled, thereby generating the boundary tactile sensation of the virtual functional area on the haptic reproduction module 603. In the embodiment of the present disclosure, the control module 602 optimizes the control mode of the existing haptic reproduction product which only depends on whether there is a driving waveform. According to the mechanical analysis when a finger touches a key, the control module 602 segments and combines parameters of the drive signal to add boundary tactile sensation to the virtual functional area, and may adjust them according to the sharpness of edge of the key, so as to more truly restore the haptic feedback effect of the key and enrich the tactile experience of the user in the virtual functional area.

In some exemplary embodiments, the haptic reproduction module includes an actuator and a touch control substrate, and the actuator is disposed on the touch control substrate. The haptic reproduction module includes multiple resonant frequencies, and different resonant frequencies correspond to different vibration types.

In some exemplary embodiments, the actuators include piezoelectric actuators, linear motor actuators, eccentric rotor actuators and electrostatic actuators and the like.

In some exemplary embodiments, the type and intensity of the boundary tactile sensation generated by the haptic reproduction module are determined according to the frequency and voltage amplitude of the first signal and the frequency and voltage amplitude of the second signal.

In some exemplary embodiments, a length of the first time period is less than a length of the second time period, and a length of the third time period is less than the length of the second time period.

In some exemplary embodiments, the frequency of the second signal is less than the frequency of the first signal.

In some exemplary embodiments, the intensity of the boundary tactile sensation generated by the haptic reproduction module is proportional to the voltage amplitude of the second signal.

In some exemplary embodiments, the voltage amplitude of the first signal is greater than or equal to the voltage amplitude of the second signal.

In some exemplary embodiments, the maximum voltage amplitude of the second signal is between 70% and 100% of the maximum voltage amplitude of the first signal.

In some exemplary embodiments, the voltage amplitude of the first signal is less than or equal to the maximum drive voltage amplitude of the actuator.

In some exemplary embodiments, the frequency of the first signal is a first frequency, the first frequency is a resonant frequency of the haptic reproduction module, or a difference between the first frequency and the resonant frequency of the haptic reproduction module is within a preset first difference range.

In some exemplary embodiments, the length of the first time period is N1 first cycles, the first cycle=1/first frequency, N1>0, and the magnitude of N1 is determined according to the measured motion acceleration of the haptic reproduction module.

In some exemplary embodiments, the frequency of the second signal is a second frequency or the second signal is an amplitude modulated wave with the second frequency as the carrier frequency;

The second frequency is the resonant frequency of the haptic reproduction module or a difference between the second frequency and the resonant frequency of the haptic reproduction module is within a preset second difference range.

In some exemplary embodiments, the length of the second time period is N2 second cycles, the second cycle=1/second frequency, N2>0, and the magnitude of N2 is determined according to the frequency of the second signal and the type of the boundary tactile sensation generated by the haptic reproduction module.

In some exemplary embodiments, the frequency of the third signal is a third frequency, the length of the third time period is N3 third cycles, the third cycle=1/third frequency, N3>0;

The third frequency is the same as the second frequency, and N3 is between 1 and 3.

In some exemplary embodiments, the phase of the second signal is 180 degrees out of phase of the third signal.

In some exemplary embodiments, the waveform types of the first signal include a square wave, a sine wave, and a triangular wave.

In some exemplary embodiments, the waveform types of the second signal include a square wave, a sine wave, a triangular wave, and an amplitude modulated wave.

In some exemplary embodiments, the waveform types of the third signal include a square wave, a sine wave and a triangular wave.

An embodiment of the present disclosure further provides a tactile sensation generation device, which may include a processor and a memory storing computer programs running on the processor, when the processor executes the computer programs, steps of the tactile sensation generation method according to any one of the preceding items in the present disclosure are implemented.

As shown in FIG. 7, in an embodiment, a tactile sensation generation device 700 may include: a processor 710, a memory 720, a bus system 730, and a transceiver 740, wherein the processor 710, the memory 720, and the transceiver 740 are connected via the bus system 730, the memory 720 is configured to store instructions, and the processor 710 is configured to execute the instructions stored in the memory 720 to control the transceiver 740 to send signals. In particular, the transceiver 740 may acquire position coordinates of the finger from a positioning device under the control of the processor 710, judge a virtual functional area touched by a finger and the position of the virtual functional area touched by the finger according to the position coordinates of the finger, select the corresponding drive signal parameters according to the virtual functional area touched by the finger and the position of the virtual functional area touched by the finger, the drive signal is a first drive signal or a second drive signal, and the first drive signal or the second drive signal is outputted to the haptic reproduction module through the transceiver, so that the haptic reproduction module generates the boundary tactile sensation or haptic feedback.

It should be understood that the processor 710 may be a Central Processing Unit (CPU), or the processor 710 may be another general-purpose processor, a digital signal processor (DSP), an application specific integrated circuit (ASIC), a field programmable gate array (FPGA), or another programmable logic device, a discrete gate or a transistor logic device, a discrete hardware component, etc. A general-purpose processor may be a microprocessor or the processor may be any conventional processor, etc.

The memory 720 may include a read-only memory and a random access memory, and provides instructions and data to the processor 710. A portion of the memory 720 may also include a non-volatile random access memory. For example, the memory 720 may also store information of a device type.

The bus system 730 may include a power bus, a control bus, a status signal bus, or the like in addition to a data bus. However, for clarity of illustration, various buses are all denoted as the bus system 730 in FIG. 7.

In an implementation process, processing performed by the processing device may be completed by an integrated logic circuit of hardware in the processor 710 or instructions in a form of software. That is, the steps of the method in the embodiments of the present disclosure may be embodied as executed and completed by a hardware processor, or executed and completed by a combination of hardware in the processor and a software module. The software module may be located in a storage medium such as a random access memory, a flash memory, a read only memory, a programmable read-only memory, or an electrically erasable programmable memory, or a register, etc. The storage medium is located in the memory 720. The processor 710 reads information in the memory 720, and completes the steps of the above method in combination with its hardware. In order to avoid repetition, detailed description is not provided herein.

An embodiment of the present disclosure also provides a computer readable storage medium, The computer readable storage medium stores executable instructions, and when the executable instruction is executed by the processor, the tactile sensation generation method provided by any embodiment of the present disclosure may be implemented, and the tactile sensation generation method can make the user feel the boundary tactile sensation of the virtual functional area, and then can be combined with the tactile sensation of the main body of the virtual functional area to more truly restore the haptic feedback of the actual functional area. The method for driving the haptic reproduction device to carry out the tactile sensation generation method by executing the executable instructions is basically the same as the tactile sensation generation method provided by the above embodiments of the present disclosure, and will not be described repeatedly here.

The present disclosure discloses a tactile sensation generation method, a haptic reproduction device and a computer storage medium. A first drive signal is outputted to the haptic reproduction module through a control module; a second drive signal is outputted to the haptic reproduction module through the control module when a position of the virtual functional area touched by the user is a middle position of the virtual functional area, which combine the boundary tactile sensation of the virtual functional area with the tactile sensation of the main body, so as to more truly restore the haptic feedback of the actual functional area. The embodiments of the present disclosure are suitable for virtual haptic reproduction devices adopting piezoelectric actuators or linear motors, eccentric rotors, electrostatic actuators and the like, and can generate locally adjustable boundary tactile sensation, realize boundary tactile sensation of virtual functional areas, and improve haptic experience of users.

It can be understood by those of ordinary skill in the art that all or some certain steps in the method disclosed above and function modules/units in the system and the apparatus may be implemented as software, firmware, hardware, and proper combinations thereof. In a hardware implementation mode, division of the function modules/units mentioned in the above description is not always division corresponding to physical components. For example, a physical component may have multiple functions, or several physical components may cooperate to execute a function or an step. Some certain components or all components may be implemented as software executed by a processor such as a digital signal processor or a microprocessor, or implemented as hardware, or implemented as an integrated circuit such as an application specific integrated circuit. Such software may be distributed in a computer-readable medium, and the computer-readable medium may include a computer storage medium (or a non-transitory medium) and a communication medium (or a transitory medium). As known to those of ordinary skill in the art, the term computer storage medium includes volatile and nonvolatile, and removable and irremovable media implemented in any method or technology for storing information (for example, a computer-readable instruction, a data structure, a program module, or other data). The computer storage medium includes, but is not limited to, RAM, ROM, EEPROM, a flash memory or another memory technology, CD-ROM, a digital versatile disk (DVD) or another optical disk storage, a magnetic cassette, a magnetic tape, a magnetic disk storage, or another magnetic storage apparatus, or any other medium that may be configured to store desired information and may be accessed by a computer. In addition, it is known to those of ordinary skill in the art that the communication medium usually includes a computer-readable instruction, a data structure, a program module, or other data in a modulated data signal of, such as, a carrier or another transmission mechanism, and may include any information delivery medium.

Although the embodiments disclosed in the present disclosure are as above, the described contents are only embodiments used for convenience of understanding the present disclosure and are not intended to limit the present disclosure. Any person skilled in the art to which the present disclosure pertains may make any modifications and variations in the form and details of implementations without departing from the spirit and the scope of the present disclosure, but the protection scope of the present disclosure shall still be subject to the scope defined in the appended claims.

The invention claimed is:

1. A tactile sensation generation method for a haptic reproduction device, the haptic reproduction device comprising a display module, a haptic reproduction module and a control module, and the tactile sensation generation method comprising:

acquiring a position of a virtual functional area touched by a user, the position being an edge position of the virtual functional area or a middle position of the virtual functional area, wherein the position is detected by the display module;

US 12,619,309 B2

15                                                                                    16 outputting a first drive signal to the haptic reproduction
    module through the control module when the display
    module detects that the position of the virtual func-
    tional area touched by the user is the edge position of
    the virtual functional area, so that the haptic reproduc-
    tion module generates a boundary tactile sensation; and
outputting a second drive signal to the haptic reproduction
    module through the control module when the display
    module detects the position of the virtual functional
    area touched by the user is the middle position of the
    virtual functional area, so that the haptic reproduction
    module generates a haptic feedback;
wherein the haptic reproduction module comprises an
    actuator and a touch control substrate, the actuator
    disposed on the touch control substrate and at an edge
    of the touch control substrate;
wherein the first drive signal output when the edge
    position of the virtual functional area is touched com-
    prises a first signal, a second signal, and a third signal,
    and a driving cycle corresponding to the first drive
    signal is divided into a first time period, a second time
    period and a third time period;
wherein the first signal drives the actuator disposed at the
    edge of the touch control substrate to a vibration
    amplitude required for operation in the first time
    period;
the second signal makes the edge of the touch control
    substrate generate different normal forces in the second
    time period through different driving waveforms,
    wherein driving waveforms with different frequencies,
    different periods and different drive voltages corre-
    spond to different amplitudes of the touch control
    substrate and different normal forces applied to a finger,
    the different frequencies and different periods affect
    types of the boundary tactile sensation, and the different
    drive voltages affect intensity of the boundary tactile
    sensation, wherein the types of the boundary tactile
    sensation comprise at least sharp boundary sensation,
    steps and gentle slopes; and
the third signal stops the vibration of the actuator disposed
    at the edge of the touch control substrate in the third
    time period;
wherein, at the edge of the touch control substrate, at a
    drive voltage of 40 Vpp, a frequency of 700 Hz, and a
    square wave driving waveform of 40 cycles, the sharp
    boundary sensation is generated;
at the edge of the touch control substrate, at the drive
    voltage of 40 Vpp, a frequency of 500 Hz, and a square
    wave driving waveform of 35 cycles, a gentle slope
    boundary tactile sensation is generated;
at the edge of the touch control substrate, at the drive
    voltage of 40 Vpp, a frequency of 100 Hz, and a square
    wave driving waveform of 12 cycles, a step boundary
    tactile sensation is generated;
wherein the frequency of the first signal is a first fre-
    quency, the first frequency is a resonant frequency of
    the haptic reproduction module, or a difference
    between the first frequency and the resonant frequency
    of the haptic reproduction module is within a preset
    first difference range;
wherein the frequency of the second signal is a second
    frequency, or the second signal is an amplitude modu-
    lated wave with the second frequency as a carrier
    frequency; and the second frequency is the resonant
    frequency of the haptic reproduction module, or the
    difference between the second frequency and the resonant frequency of the haptic reproduction module is
    within a preset second difference range.
2. The tactile sensation generation method according to
claim 1, wherein:
    the haptic reproduction module is configured to acquire
        the first signal within the first time period so as to
        achieve a stable vibration state;
    the haptic reproduction module is configured to acquire
        and vibrate the second signal according to a type and
        intensity of the boundary tactile sensation within the
        second time period;
    the haptic reproduction module is configured to acquire
        the third signal and stop vibration within the third time
        period;
    the type and intensity of the boundary tactile sensation are
        determined according to a frequency and voltage
        amplitude of the first signal and a frequency and
        voltage amplitude of the second signal.
3. The tactile sensation generation method according to
claim 2, wherein a length of the first time period is less than
a length of the second time period, and a length of the third
time period is less than the length of the second time period.
4. The tactile sensation generation method according to
claim 2, wherein the frequency of the second signal is
smaller than the frequency of the first signal.
5. The tactile sensation generation method according to
claim 2, wherein the intensity of the boundary tactile sen-
sation generated by the haptic reproduction module is pro-
portional to the voltage amplitude of the second signal.
6. The tactile sensation generation method according to
claim 2, wherein the voltage amplitude of the first signal is
greater than or equal to that of the second signal.
7. The tactile sensation generation method according to
claim 2, wherein the maximum voltage amplitude of the
second signal is between 70% and 100% of the maximum
voltage amplitude of the first signal.
8. The tactile sensation generation method according to
claim 2, wherein the haptic reproduction module comprises
a plurality of resonant frequencies, and different resonant
frequencies correspond to different vibration types.
9. The tactile sensation generation method according to
claim 8, wherein a voltage amplitude of the first signal is less
than or equal to a maximum drive voltage amplitude of the
actuator.
10. The tactile sensation generation method according to
claim 2, wherein the length of the first time period is N1 first
cycles, the first cycle=1/the first frequency, N1>0, and the
magnitude of N1 is determined according to the motion
acceleration measured by the haptic reproduction module.
11. The tactile sensation generation method according to
claim 2, wherein the length of the second time period is N2
second cycles, the second cycle=1/the second frequency,
N2>0, and the magnitude of N2 is determined according to
the frequency of the second signal and the type of boundary
tactile sensation generated by the haptic reproduction mod-
ule.
12. The tactile sensation generation method according to
claim 11, wherein the frequency of the third signal is a third
frequency, the length of the third time period is N3 third
cycles, the third cycle=1/the third frequency; and
    the third frequency is the same as the second frequency,
        and N3 is between 1 and 3.
13. The tactile sensation generation method according to
claim 2, wherein the phase of the second signal is 180° out
of phase of the third signal.

14. The tactile sensation generation method according to claim 2, wherein a waveform type of the first signal comprises a square wave, a sine wave or a triangular wave; or a waveform type of the second signal comprises a square wave, a sine wave, a triangular wave or an amplitude modulated wave; or a waveform type of the third signal comprises a square wave, a sine wave or a triangular wave.

15. A haptic reproduction device comprising at least one processor and a memory storing computer programs running on the at least one processor, wherein when the at least one processor executes the computer programs, functions of a display module, a haptic reproduction module and a control module are implemented, wherein the display module is configured to detect a position of the virtual functional area touched by a user, the position being an edge position of the virtual functional area or a middle position of the virtual functional area;

the control module is configured to acquire the position of the virtual functional area touched by the user detected by the display module, output a first drive signal to the haptic reproduction module when the position of the virtual functional area touched by the user is the edge position of the virtual functional area; and output a second drive signal to the haptic reproduction module when the position of the virtual functional area touched by the user is the middle position of the virtual functional area; and the haptic reproduction module is configured to receive the first drive signal outputted by the control module and generate a boundary tactile sensation; or, receive the second drive signal outputted by the control module and generate a haptic feedback;

wherein the haptic reproduction module comprises an actuator and a touch control substrate, the actuator disposed on the touch control substrate and at an edge of the touch control substrate;

wherein the first drive signal output when the edge position of the virtual functional area is touched comprises a first signal, a second signal, and a third signal, and a driving cycle corresponding to the first drive signal is divided into a first time period, a second time period and a third time period;

the first signal is configured for driving the actuator disposed at the edge of the touch control substrate to a vibration amplitude required for operation in the first time period;

the second signal is configured for making the edge of the touch control substrate generate different normal forces in the second time period through different driving waveforms, wherein driving waveforms with different frequencies, different periods and different drive voltages correspond to different amplitudes of the touch control substrate and different normal forces applied to a finger, the different frequencies and different periods affect types of the boundary tactile sensation, and the different drive voltages affect intensity of the boundary tactile sensation, wherein the types of the boundary tactile sensation comprise at least sharp boundary sensation, steps and gentle slopes; and the third signal is configured for stopping the vibration of the actuator disposed at the edge of the touch control substrate in the third time period;

wherein, at the edge of the touch control substrate, at a drive voltage of 40 Vpp, a frequency of 700 Hz, and a square wave driving waveform of 40 cycles, the sharp boundary sensation is generated;

at the edge of the touch control substrate, at the drive voltage of 40 Vpp, a frequency of 500 Hz, and a square wave driving waveform of 35 cycles, a gentle slope boundary tactile sensation is generated;

at the edge of the touch control substrate, at the drive voltage of 40 Vpp, a frequency of 100 Hz, and a square wave driving waveform of 12 cycles, a step boundary tactile sensation is generated;

wherein the frequency of the first signal is a first frequency, the first frequency is a resonant frequency of the haptic reproduction module, or a difference between the first frequency and the resonant frequency of the haptic reproduction module is within a preset first difference range;

wherein the frequency of the second signal is a second frequency, or the second signal is an amplitude modulated wave with the second frequency as a carrier frequency; and the second frequency is the resonant frequency of the haptic reproduction module, or the difference between the second frequency and the resonant frequency of the haptic reproduction module is within a preset second difference range.

16. The haptic reproduction device according to claim 15, wherein the haptic reproduction module comprises a plurality of resonant frequencies, and different resonant frequencies correspond to different vibration types.

17. The haptic reproduction device according to claim 16, wherein the actuator comprises a piezoelectric actuator, a linear motor actuator, an eccentric rotor actuator, and an electrostatic actuator.

18. A non-transitory computer storage medium, storing computer executable instructions, wherein the computer executable instructions, when executed by at least one processor, cause the at least one processor to perform the following steps:

acquiring a position of a virtual functional area touched by a user, the position being an edge position of the virtual functional area or a middle position of the virtual functional area, wherein the position is detected by a display module;

outputting a first drive signal to a haptic reproduction module through a control module when the display module detects that the position of the virtual functional area touched by the user is the edge position of the virtual functional area, so that the haptic reproduction module generates a boundary tactile sensation; and outputting a second drive signal to the haptic reproduction module through the control module when the display module detects that the position of the virtual functional area touched by the user is the middle position of the virtual functional area, so that the haptic reproduction module generates a haptic feedback;

wherein the first drive signal output when the edge position of the virtual functional area is touched comprises a first signal, a second signal, and a third signal, and a driving cycle corresponding to the first drive signal is divided into a first time period, a second time period and a third time period;

wherein the first signal drives an actuator of the haptic reproduction module to a vibration amplitude required for operation in the first time period, and the actuator is disposed on a touch control substrate and at an edge of the touch control substrate;

the second signal makes the edge of the touch control substrate of the haptic reproduction module generate different normal forces in the second time period through different driving waveforms, wherein driving waveforms with different frequencies, different periods and different drive voltages correspond to different amplitudes of the touch control substrate and different normal forces applied to a finger, the different frequencies and different periods affect types of the boundary tactile sensation, and the different drive voltages affect intensity of the boundary tactile sensation, wherein the types of the boundary tactile sensation comprise at least sharp boundary sensation, steps and gentle slopes; and the third signal stops the vibration of the actuator disposed at the edge of the touch control substrate in the third time period;

wherein, at the edge of the touch control substrate, at a drive voltage of 40 Vpp, a frequency of 700 Hz, and a square wave driving waveform of 40 cycles, the sharp boundary sensation is generated;

at the edge of the touch control substrate, at the drive voltage of 40 Vpp, a frequency of 500 Hz, and a square wave driving waveform of 35 cycles, a gentle slope boundary tactile sensation is generated;

at the edge of the touch control substrate, at the drive voltage of 40 Vpp, a frequency of 100 Hz, and a square wave driving waveform of 12 cycles, a step boundary tactile sensation is generated;

wherein the frequency of the first signal is a first frequency, the first frequency is a resonant frequency of the haptic reproduction module, or a difference between the first frequency and the resonant frequency of the haptic reproduction module is within a preset first difference range;

wherein the frequency of the second signal is a second frequency, or the second signal is an amplitude modulated wave with the second frequency as a carrier frequency; and the second frequency is the resonant frequency of the haptic reproduction module, or the difference between the second frequency and the resonant frequency of the haptic reproduction module is within a preset second difference range.

* * * * *